Sept. 26, 1939.     J. FEERICK ET AL     2,174,259
MOTOR CLUTCH AND TRANSMISSION MECHANISM
Filed Oct. 18, 1937     2 Sheets-Sheet 1

INVENTORS
Jay Feerick
William R. Smyth
BY
Joseph B. Gardner
ATTORNEY.

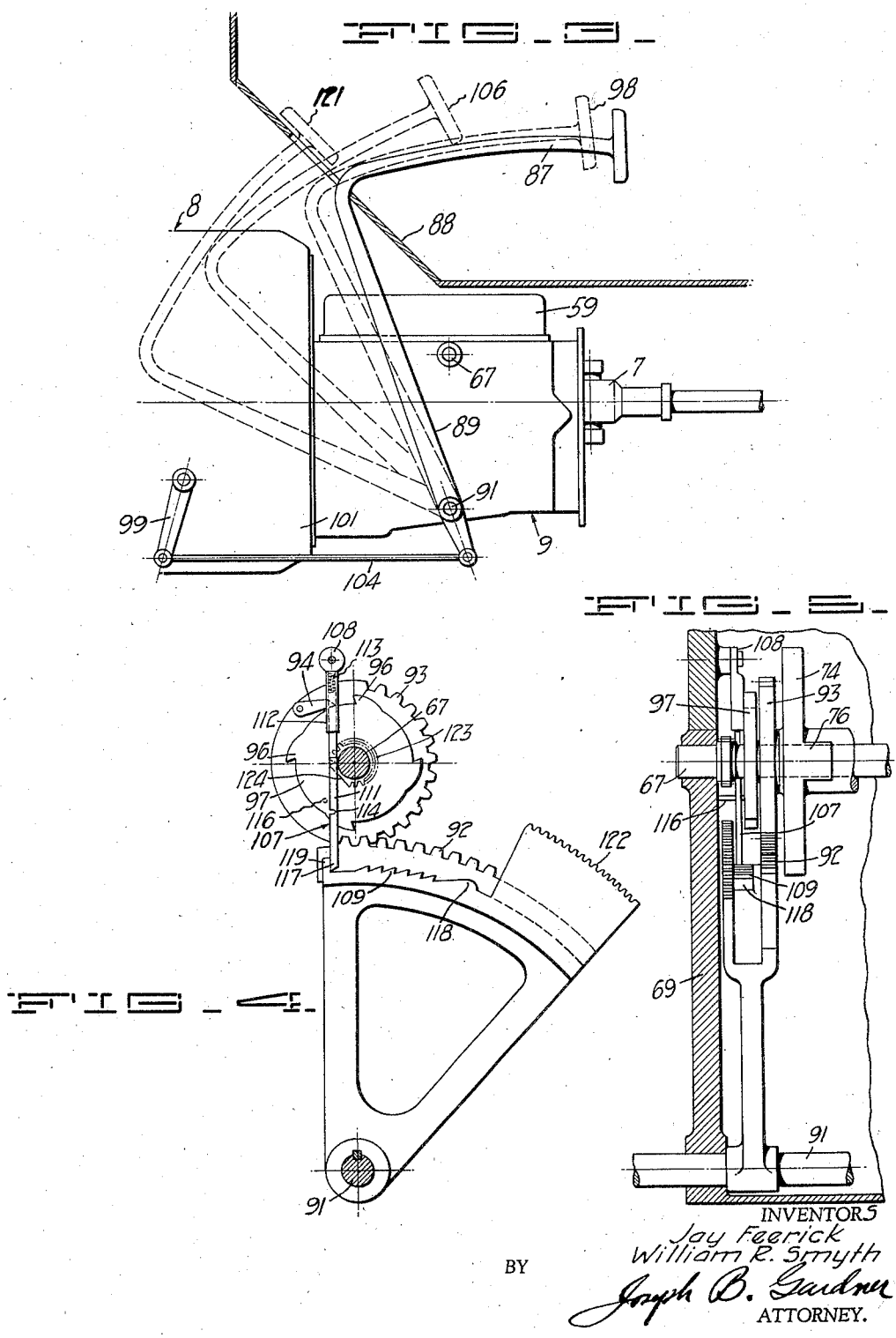

Patented Sept. 26, 1939

2,174,259

UNITED STATES PATENT OFFICE 2,174,259

MOTOR CLUTCH AND TRANSMISSION MECHANISM

Jay Feerick, Oakland, and William R. Smyth, Hayward, Calif., assignors of one-third to Edwin E. Dunstan, Oakland, Calif.

Application October 18, 1937, Serial No. 169,556

7 Claims. (Cl. 74—330)

The invention relates to clutch and transmission mechanisms such as used in automobiles and the like.

An object of the present invention is to provide a clutch and transmission mechanism of the character described which will be unitarily operated by a single operating member such as a foot pedal or the like and which, on operation of such member, will automatically de-clutch the driving connection between the drive and driven members and will, depending upon its amount of movement, automatically connect any of a series of different speed transmission units between said drive and driven members.

Another object of the invention is to provide a clutch and transmission unit of the character above wherein the several transmission units are constantly engaged with the driven member and wherein the several gears used in the units are constantly enmeshed so that a change from one transmission unit to another may be accomplished at substantially any engine speed without causing a clashing of gears.

A further object of the invention is to provide a mechanism of the character described wherein several clutch sections are used and which are connected to the different transmission units and are movable into and from a position of engagement with a master clutch section connected to the drive member, whereby the change from one transmission unit to a different speed transmission unit may be effected merely by advancing and retracting certain of said clutch sections into and from a position of engagement with the master clutch section and without requiring any changing of gears or the like.

Still another object of the invention is to provide a mechanism of the character described which is designed and arranged in a manner providing for a constant lubrication of the operating parts and wherein the latter are so constructed as to insure a positiveness of operation and a long and substantially unlimited life of mechanism.

The invention possesses other objects and features of advantage, some of which, with the foregoing, will be set forth in the following description of the preferred form of the invention which is illustrated in the drawings accompanying and forming part of the specification. It is to be understood, however, that variations in the showing may be adopted within the scope of the invention as set forth in the claims.

Referring to said drawings:

Figure 3 is a side elevation of the mechanism showing the operative connection between the clutch pedal and the several parts of the mechanism.

Figure 4 is a side elevation of a part of the operating connection between the clutch pedal and transmission mechanism.

Figure 5 is an end elevation of the mechanism illustrated in Figure 4.

Figure 1:
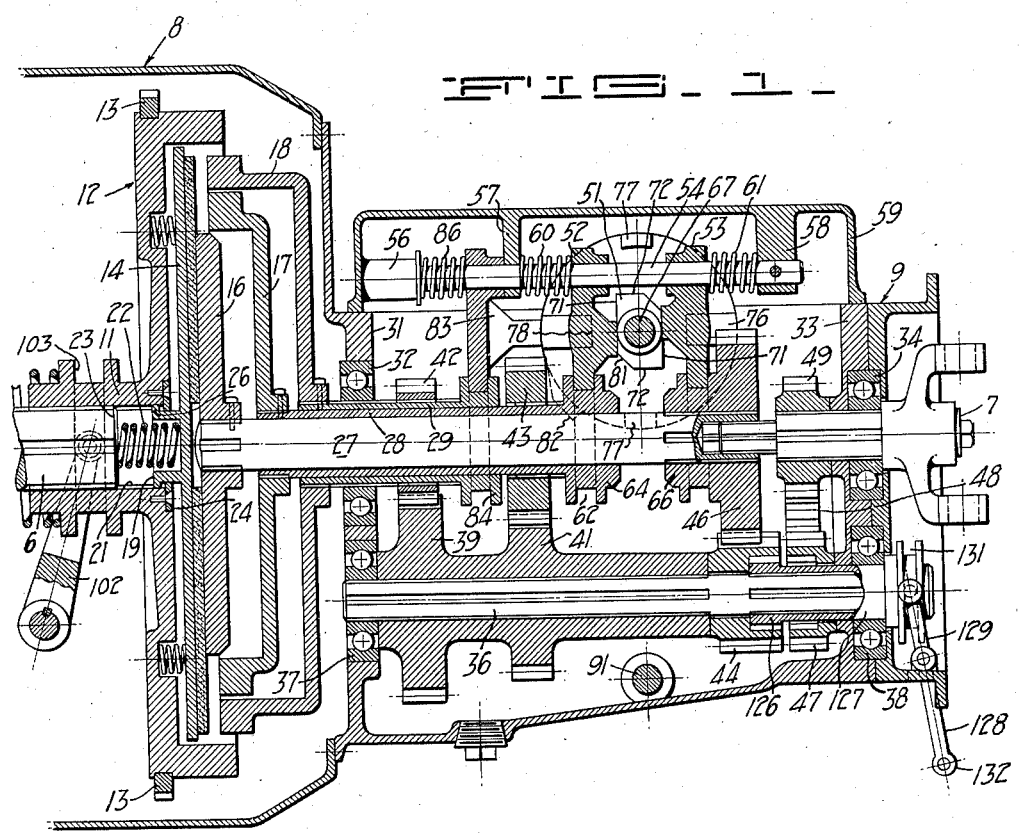
Figure 1 is a longitudinal, vertical sectional view of a clutch and transmission unit constructed in accordance with the present invention.
Figure 2:
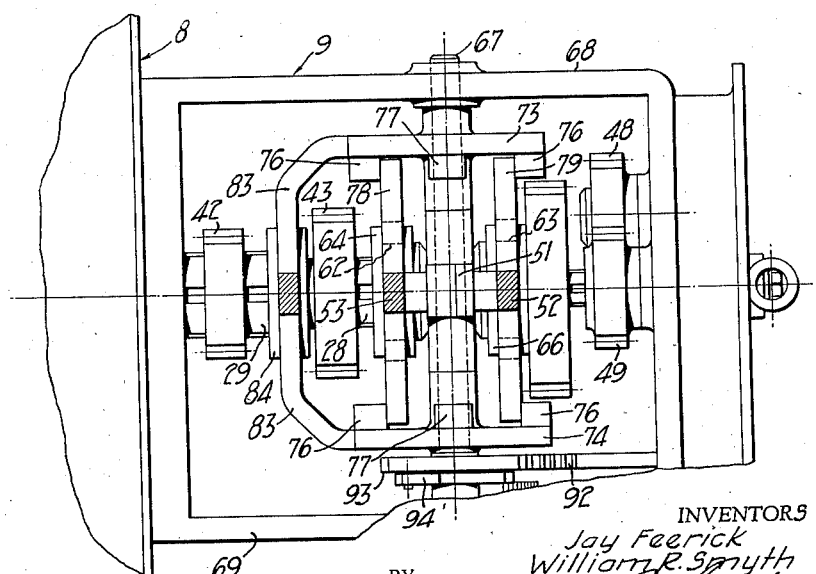
Figure 2 is a plan sectional view of the transmission mechanism shown with the top cover thereof removed and substantially on the plane of the base of such section.

The clutch and variable speed transmission mechanism with the present invention consist briefly in the inter-positioning between a drive member and a driven member of a plurality of different speed transmission units which are constantly connected to the driven member and which are selectively connected to the drive member by means of a master clutch section carried by the drive member and a plurality of clutch sections connected to the individual transmission units and being individually advanceable and retractable into a position engaging the master clutch section. The selective connection of these individual clutch sections to the master clutch section is arranged to be effective by a single operating member such as a clutch pedal and which, in accordance with its amount of movement, effects the selective engagement of the secondary clutch sections to the master clutch section.

An apparatus for carrying out the above has been illustrated in the accompanying drawings and comprises a drive member 6 and a driven member 7 which are rotatably carried in substantially longitudinal alignment in connected clutch and transmission casings 8 and 9 respectively. The drive member 6 is adapted for connection to an engine or other suitable source of power and slidably supports the hub portion 11 of a master clutch disc or plate 12, the latter being splined to the shaft 6 for rotation therewith. The member 12 may be constructed in such a manner as to provide a fly-wheel for the engine, and as here shown, is provided with a ring gear 13 around its periphery for connection to a starter motor or the like. An auxiliary intermediate clutch plate 14 is supported by the plate 12 and provides an intermediate driving connection between the latter and a plurality of clutch plates or sections 16, 17 and 18, which are mounted for engagement with an opposite side of the plate 14. The plate 14 is provided with a central hub portion 19 which is reciprocally and rotatably mounted in a cylindrical bearing portion 21 in the master clutch plate 12, and is normally pressed to an outwardly spaced position relative to the plate 12 by means of a helical spring 22 mounted between the end 23 of the shaft 6 and the hub portion 19 of the plate 14.

The hub 19 is confined in the bearing 21 by means of a ring plate 24 secured to the clutch plate 12 and which engages an annular shoulder 26 on the hub.

The clutch members or sections 16, 17 and 18 are arranged for individual co-axial engagement with the plate 14 as here shown, the section 16 is of disc form while the sections 17 and 18 are of ring form of different diameters, so that the ring 17 will surround the disc 16 and the ring 18 will surround the ring 17. The members 16, 17 and 18 are secured at their hub portions to a shaft 27, sleeve 28 and sleeve 29, the sleeve 28 being journaled on the shaft 27 and the sleeve 29 being journaled on the shaft 28, so that the clutch sections are each provided with a co-axial rotational support about the central axis of the shaft 27. The shaft and sleeves 27, 28 and 29 extend from the interior of the clutch casing 8 through a common wall 31 of the casing, where the sleeve 29 is supported in a bearing 32 and into the interior of the casing 9 and the shaft 27 is splined at its opposite end in the casing 9 to the driven shaft 7, which extends through an outer wall 33 in the casing 9 and is supported thereat in a bearing 34.

In accordance with the present arrangement, a plurality of different speed transmission units are connected between each of the sleeves 28 and 29 and the shaft 27 and the latter are constantly connected to the shaft 27 and are placed into and out of operation by the advancement and retraction of the several clutch sections 16, 17 and 18 into and out of engagement with the clutch plates 14 and 12. As here shown, these variable speed units are provided for by the use of a counter-shaft 36 journaled at its ends in bearings 37 and 38 in the walls 31 and 33 of the casing 9, and which supports a pair of gears 39 and 41 which mesh with gears 42 and 43 on the sleeve 29 and the sleeve 28 respectively. The movement of the counter-shaft 36 is transmitted to the shaft 27 and thence to the driven member by means of a direct drive gear 44 which is engaged with a gear 46 on the shaft 27, and a reverse driving gear 47 which is connected through an idler pinion 48 to a gear 49 on the driven shaft 7. It will thus be clear that when the clutch section 16 is engaged with the plate 14 and the master clutch plate 12, power will be transmitted through the shaft 27 directly to the driven shaft 7. When the clutch section 16 is retracted and the clutch section 17 advanced into engagement with the clutch plate 14, power is transmitted through the sleeve 28 and gears 43 and 41 to the counter-shaft 36 and then by way of gears 44 and 46 to the shaft 27 of the driven shaft 7. When the clutch sections 16 and 17 are retracted and the section 18 advanced to a position engaging the clutch plate 14, power is transmitted through the sleeve 29 and gears 42 and 39 to the counter-shaft 36 and thence by way of gears 44 and 46 to the shaft 27 and the driven shaft 7.

Means are provided for insuring the individual retraction and advance of any of the clutch members 16, 17 and 18 so that only one at a time of these clutch sections will be engaged with the plate 14. This is accomplished by mounting a rotatable cam 51 between brackets 52 and 53 connected to the sleeve 28 and the shaft 27 respectively, whereby upon rotation of the cam, a differential displacement between the shaft and sleeve may be effected. The brackets 52 and 53 are slidably supported at their upper ends on a transverse supporting pin 54 carried by an end 56 and depending lugs 57 and 58 in a cover 59 of the casing 9 and are normally resiliently pressed into engagement with the opposite sides of the cam 51 by means of helical springs 60 and 61 surrounding the pin 54 and compressed between the brackets and the lugs 57 and 58. The lower ends of the brackets are bifurcated and engaged in annular channels or grooves 62 and 63 formed in members 64 and 66 fixed to the sleeve 28 and the shaft 27 respectively. The cam 51 is so arranged that on rotation in steps of 90°, the shaft 27 and sleeve 28 will be displaced to alternately connect the clutch members 16 and 17 to the plate 14. Preferably, these two positions of transmission provide the high and second speeds of the transmission unit, the connection through the clutch section 16 and the shaft 27 being a direct drive from the motor to the driven shaft and the connection between the sleeve 28 and the driven member being effected as aforesaid through reduction gears 43 and 41, and 44 and 46.

The cam as illustrated in Figure 1, is supported on a transverse shaft 67 journaled at its ends in bearings provided by the side walls 68 and 69 of the casing 9 and is provided with two sets 71 and 72 of opposed parallel sides for accomplishing the aforesaid shift. As illustrated in Figure 1, opposed sides 71 of the cam are engaged with the members 52 and 53 and such engagement causes the retraction of the clutch section 17 due to the pressure of spring 60 on member 52 and the advancement of clutch section 16 due to the pressure of spring 61 on member 53. Upon rotation of the cam through 90°, the opposed sides 72 of the cam are brought into engagement with the members 52 and 53 and in accordance with the present arrangement, the sides 72 are spaced a greater difference apart than are the sides 71. As a result, the member 52 is urged longitudinally of the shaft 27, which causes an advancement of the member 17 into engagement with the plate 14 and the member 53 is displaced in an opposite direction to retract the shaft 27 and the clutch section 16. Preferably, means are used for positively holding the members 52 and 53 against the opposed sides of the cam and as here shown, a pair of wheels 73 and 74 are mounted on the shaft 67 at opposite sides of the members 52 and 53 and are provided with inwardly engaging sets of lugs 76 and 77 for engaging the outer sides 78 and 79 of the members 52 and 53 when the cam is moved into the position aforesaid.

The "low" or most reduced transmission speed, is effected by advancing the clutch section 18 into engagement with the clutch plate 14, while the clutch sections 16 and 17 are retracted therefrom so that power will be transmitted through the section 18, the outer sleeve 29, the gears 42 and 39, to the counter-shaft 36 and then by gears 44 and 46 to the shaft 27 and the driven shaft 7. This position of the clutch sections is effected by the movement of the cam 51 to an intermediate position between the sides 71 and 72 so as to engage intermediate sides 81 of the cam against the members 52 and 53. The sides 81 are so spaced as to retract both of the clutch sections 16 and 17. In this position of the cam, a cam shoulder 82 on wheels 73 and 74 is moved against the transmission ends of a bracket or arm 83 slidably supported at its upper end on the pin 54, and engaging at its lower end in a collar 84 secured to the sleeve 29 so as to displace the sleeve and the clutch section 18 into a position engaging the latter with the clutch plate 14. The movement of the member 83 is resisted by a helical spring 86 carried by the pin 54 and abutting the cover side 56.

Preferably, the gears 42 and 43 are splined to the sleeves 28 and 29 so as to enable a relative displacement of the sleeves and gears without a relative displacement between these gears and the meshed gears 39 and 41 on the counter-shaft. This provision enables the use of a special type of gear teeth on these teeth, such as spiral or herringbone, for minimizing the sound.

As above indicated, the shifting of the several transmission units into and out of operation is arranged to be effected by means of a single operating member such as a clutch pedal 87 which, as illustrated in Figure 3, extends through the floor boards 88 of the vehicle and is provided with a depending portion 89 which is secured adjacent its lower end to a transverse auxiliary shaft 91 carried by the side walls 68 and 69 of the casing 9. Rotation of the shaft 91 is transmitted to the cam shaft 67 by means of a segment member 90 carried by the shaft 91 and which is provided with teeth 92 engaged with a gear 93 rotatably carried on the shaft 67. The gear 93 is provided with a dog 94 which is adapted to engage with one of a plurality of shoulders 96 on a wheel 97 fixed to the shaft 67 for rotating the shaft upon appropriate rotation of the gear 93. As here shown, the shoulders 96 are positioned at substantially 90° intervals around the periphery of the wheel 97 and the dog 94 is normally spaced from one of these shoulders so as to provide for a limited movement of the clutch pedal and the gear 93 without imparting any movement to the cam shaft 67. This initial movement of the clutch pedal and indicated by the dotted outline 98 of the clutch pedal, operates to effect a retraction of the master clutch plate 12 from the intermediate clutch plate 14 and thus de-clutch the mechanism without changing any of the transmission gear ratios. Displacement of the master clutch unit from the clutch shaft is effected by means of a lever 99 pivotally supported by a side wall 101 of the clutch casing 8 and which at its inner end, is provided with spaced arm portions 102 which engage in a channel or collar 103 provided on the hub 11 of the master clutch section. The outer portion of the lever 99 is connected by means of a link 104 to the lower end of the clutch portion 89, so that upon inward displacement of the clutch pedal to the position indicated at 98, the lever 99 will be rocked sufficiently to retract the clutch plate 12 from the intermediate clutch plate 14. On further displacement of the clutch pedal to a position indicated by the dotted outline 106 of the clutch, the gear 93 is rotated to displace the cam shaft 90°.

Preferably, means are provided for preventing a return of the clutch pedal once the same has entered the zone of movement between positions 98 and 106 until the clutch pedal is moved to the end of this zone of movement and the cam rotated a full 90°. This means is here in the form of a detent member 107 secured at its upper end 108 to a side wall of the casing 8 and which operatively engages a series of ratchet teeth 109 carried by the segment gear 92. The detent member is preferably formed of a pair of telescopic sections 111 and 112 which are resiliently pressed to a distended position by means of a helical spring 113 carried by the outer and upper section 112 and the lower section 111 is provided with a notch 114 which is engageable upon compression of the sections with a pin 116 carried by the side wall 69 of the casing 9. Upon depression of the clutch pedal and rotation of the segment gear 92 to a position beyond the pedal position 98, the lower end 117 of the detent will be pressed by the spring 113 into engagement with the ratchet teeth 109, thereby preventing return movement of the clutch. Just prior to the end position 106 of the pedal, a shoulder 118 on the segment member 90 engages the end 117 of the detent member and to raise the same to engage the notch 114 and pin 116 so as to retract the lower end of the detent from the ratchet teeth upon return movement of the clutch. Upon movement of the clutch to a starting position, an arm 119 carried by the segment gear engages the opposite side of the detent to remove the slot 114 from the pin 116 and allow the lower end of the detent to move down against the ratchet surface of the segment member. It will be noted that the mechanism may be maintained in a de-clutched neutral position by depressing the clutch pedal to an intermediate position retracting the master clutch plate and allowing the ratchet to hold the pedal in such position.

The shifting of the transmission units to engage the lowest speed unit is arranged to be effected upon moving the clutch pedal from position 106 to a fully depressed position 121. On this movement, a second gear 122 carried by the segment member 90 is advanced into engagement with a gear 123 on the cam shaft 67, the ratio between the gears 122 and 123 being such that upon movement of the clutch pedal from position 106 to 121, the cam shaft 67 will be rotated substantially 360°. In accordance with the present arrangement, the gear 123 has the teeth thereon omitted or cut away at a side 124 opposite to the position of engagement of the cam 82 on the wheels 73 and 74 with the bracket 83 of the low gear shifting mechanism.

It will now be clear that the clutch and variable speed transmission mechanism is entirely controlled by the operation of a single member such as the clutch pedal here shown, and that a full and complete forward operation of an automotive vehicle can be controlled by this lever. Upon displacing the clutch lever to position 98 the mechanism is de-clutched without affecting any shifting of the transmission units and upon release of the clutch lever the gear ratio will remain unchanged. Upon movement of the clutch pedal to position 106, the mechanism will first be de-clutched and the transmission units shifted so as to change from high to second or from second to high, depending upon the former connection, and upon release of the clutch pedal the gear ratio will be automatically changed. A fixed neutral position may be obtained by movement of the pedal into the zone between positions 98 and 106 and allowing the ratchet to hold the mechanism in this position. Lastly, on movement of the clutch pedal to its furthest depressed position 121, the mechanism will be de-clutched and shifted into low in the order named, regardless of the former operative position of the transmission mechanism.

Means is provided for reversing the direction of rotation of the driven shaft 7 upon shifting of the mechanism into low gear and as here shown, operates by keying the gear 47, which normally rides free on the counter-shaft 36, to the counter-shaft so that the drive connection will be effected through the reverse idler gear 48 connecting the gears 47 and 49 on the counter-shaft and the driven shaft respectively. Such means here consists of a key 126 which is carried by a sleeve 127 on the counter-shaft and which is slidable longitudinally of the shaft between the gears 44 and 47 to alternately connect them to the counter-shaft. Longitudinal displacement of the sleeve is here effected by means of a lever 128 pivoted to the casing 9 and having a bifurcated end 129 engaged in a channel or collar 131 provided on the sleeve 127. The outer end 132 of the lever may be connected by any suitable means, not shown, to an operating member in the driver's compartment for controlling the direct drive and reverse drive positions of the sleeve.

We claim:

1. A clutch and variable speed mechanism comprising, a drive member, a driven member, a plurality of different speed transmission units constantly connected to said driven member, a clutch plate connected to said drive member, a plurality of clutch plates connected with said transmission units and each being movable to and from a position engaging said first clutch plate, a foot pedal, and means operative upon movement of said pedal in one direction for retracting said first clutch plate from a position of engagement with said other clutch plates and selectively advance any of said second named plates into position for engagement with said first clutch plate and on movement of said foot pedal in an opposite direction to return said first clutch plate to position engaging the second clutch plate so advanced.

2. A clutch and variable speed mechanism comprising, a drive member, a driven member, a plurality of different speed transmission units constantly connected to said driven member, a clutch plate connected to said drive member, a plurality of clutch plates connected with said transmission units and each being movable to and from a position engaging said first clutch plate, a foot pedal, and means operative upon movement of said pedal in one direction to retract said first clutch from said position and selectively displace said second named plates into and from said position depending upon the amount of movement of said pedal, and upon return movement of said pedal to return said first clutch plate to said position.

3. A clutch and variable speed mechanism comprising, a drive member, a driven member, a plurality of different speed transmission units constantly connected to said driven member, a clutch plate connected to said drive member, a plurality of clutch plates connected with said transmission units and each being movable to and from a position engaging said first clutch plate, a foot pedal, and a cam connected to and rotated by said pedal and being operative upon movement of said pedal in one direction to retract said first plate from said position and to selectively advance said second plates into and from said position depending on the amount of movement of said pedal and on return movement of said pedal to return said clutch plate to said position.

4. A clutch and variable speed mechanism comprising, a drive member, a driven member, a plurality of different speed transmission units constantly connected to said driven member, a clutch plate connected to said drive member, a plurality of clutch plates connected with said transmission units and each being movable to and from a position engaging said first clutch plate, a foot pedal, means operative upon movement of said pedal in one direction to retract said first clutch plate from said position and to effect upon movement of said pedal through several zones of movement for the selective advancement and retraction of said second named plates to and from said position, and on return movement to return said first clutch plate to said position, and means operative upon movement of said pedal into one of said zones to prevent its retraction prior to completion of movement to the end of said zone.

5. A clutch and variable speed mechanism comprising, a drive member, a driven member, a plurality of different speed transmission units constantly connected to said driven member, a clutch plate connected to said drive member, a plurality of clutch plates connected with said transmission units and each being movable to and from a position engaging said first clutch plate, a foot pedal, means operative upon movement of said pedal in one direction to retract said first clutch plate from said position and to effect upon movement of said pedal through several zones of movement for the selective advancement and retraction of said second named plates to and from said position, and on return movement to return said first clutch plate to said position, and ratchet means operative upon movement of said pedal into one of said zones to prevent its retraction prior to completion of movement to the end of said zone.

6. A clutch and variable seed mechanism comprising, a drive member, a driven member, a shaft connected to said driven member, a plurality of different speed transmission units constantly connected to said shaft, a clutch plate connected to said drive member, a clutch member directly attached to said shaft and movable into engagement with said clutch plate to produce a direct connection of said driven member to said drive member, a plurality of clutch members connected with said transmission units, rotary cam means for selectively advancing any of said clutch members into position for engagement with said plate and single control means for actuation of said cam operative upon a single reciprocative motion to selectively engage each of said transmission units.

7. A clutch and variable speed mechanism comprising, a drive member, a driven member, a shaft connected to said driven member, a plurality of different speed transmission units constantly connected to said shaft, a clutch plate connected to said drive member, a clutch member directly attached to said shaft and movable into engagement with said clutch plate to produce a direct connection of said driven member to said drive member, a plurality of clutch members connected with said transmission units, cam means for selectively advancing any of said clutch members into position for engagement with said plate, and reverse gear mechanism adapted to be connected to each of said transmission units and said driven member.

JAY FEERICK.
WILLIAM R. SMYTH.